(12) United States Patent
Yi et al.

(10) Patent No.: US 7,091,634 B2
(45) Date of Patent: *Aug. 15, 2006

(54) HALF-JACKET EYEWEAR WITH REMOVABLE DUST SHIELD

(75) Inventors: Kenyon Yi, Glendale, CA (US); Kyung Min, Seoul (KR)

(73) Assignee: KBC America, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/608,123

(22) Filed: Jun. 30, 2003

(65) Prior Publication Data

US 2004/0066486 A1  Apr. 8, 2004

Related U.S. Application Data

(63) Continuation-in-part of application No. 09/992,361, filed on Nov. 19, 2001, now Pat. No. 6,793,336.

(30) Foreign Application Priority Data

Jul. 26, 2001 (KR) ................................ 2001-22673

(51) Int. Cl.
*G02C 11/08* (2006.01)
*G02C 1/00* (2006.01)

(52) U.S. Cl. ......................................... 310/62; 351/41
(58) Field of Classification Search ................. 351/62, 351/158, 41, 47, 48, 57, 122, 103; 2/436, 2/437

See application file for complete search history.

(56) References Cited

U.S. PATENT DOCUMENTS 5,191,364 A    3/1993  Kopfer
5,583,583 A  * 12/1996  Wilson ......................... 351/41
6,233,342 B1   5/2001  Fernandez
6,641,263 B1 * 11/2003  Olney .......................... 351/62
6,926,403 B1 *  8/2005  Yi et al. ....................... 351/62
2002/0033930 A1  3/2002  Min

* cited by examiner

*Primary Examiner*—Hung Xuan Dang
(74) *Attorney, Agent, or Firm*—Miles & Stockbridge P.C.; Edward J. Kondracki (57) ABSTRACT

Disclosed is eyewear that may have a half-jacket frame and a removable dust shield for preventing direct impingement of dust upon a wearer's eye. The eyewear may have a titanium frame and removable lenses free of any attachment structure. The frame may have a lens-retaining ridge with a thin cross section. A nosepad on the frame may carry a shield retainer for releasably affixing a shield to the frame. The nosepad and the half-jacket frame front may be cast together in one piece out of titanium or titanium alloy. An anti-slip nosepad cover may partially cover the nosepad and leave the shield retainer exposed. A removable shield may have a lower lens groove that circumferentially mates with an upper lens groove of an orbital of a half-jacket frame, thereby circumferentially completing the lens groove when the shield is in place. A rigid temple may carry a slip resistor for contacting the wearer's skin. The eyewear may have a vent to reduce fogging of the lenses and the shield may be air-permeable.

19 Claims, 9 Drawing Sheets

HALF-JACKET EYEWEAR WITH REMOVABLE DUST SHIELD

This is a continuation-in-part of U.S. patent application Ser. No. 09/992,361 filed Nov. 19, 2001 now U.S. Pat. No. 6,793,336, entitled "Ventilated Sunglasses with a Removable Pad," which claims priority to Korean application Ser. No. 2001-22673 filed Jul. 26, 2001.

FIELD OF THE INVENTION

The subject application relates to eyewear, and more particularly to eyewear worn in conjunction with high speed sports such as motorcycle or bicycle riding.

BACKGROUND

Eyewear typically has a frame for holding lenses in place. A frame that extends only part of the way around a lens is known as a half-jacket frame. The inventors herein have identified various considerations in the design of half-jacket and other eyewear.

For example, when a person wears half-jacket eyewear, there may be more space around the lens than with full jacket eyewear, permitting dust or wind to impinge upon the wearer's eye, especially when the wearer is a participant in high speed sports such as motorcycle riding.

As another example, when eyewear is provided with a detachable shield, a suitable attachment means is needed. The eyewear needs to be functional and aesthetic both with and without the shield.

As a still further example, half-jacket frames lack fully circumferential orbitals around the lenses and may have less strength or dimensional stability than similar full-jacket frames. Such half-jacket frames may thus require special design considerations.

SUMMARY OF THE INVENTION

In a first embodiment of the present invention, half jacket eyewear is provided with a removable shield for reducing impingement of moving air and dust on a user's eye, the removable shield forming a circumferential tunnel from the eye to the eyewear.

In a second embodiment, half-jacket eyewear is provided with a shield retainer on a nose-contacting element.

In a third embodiment, half-jacket goggles are provided with a shield retainer that is substantially hidden.

In a fourth embodiment, half-jacket eyewear comprises titanium and has a face-contacting shield.

In a fifth embodiment, half-jacket eyewear is provided with a thin lens-retaining ridge.

In a sixth embodiment, half-jacket eyewear is provided with temple gripping means substantially hidden when the eyewear is worn.

In a seventh embodiment, eyewear is provided with a shield and a removable lens.

In an eighth embodiment, titanium wrap-around goggles are provided with a shield retainer for a removable shield.

In a ninth embodiment, titanium eyewear is provided with a shield retainer on a nose-contacting element.

In a tenth embodiment, half-jacket eyewear is provided with a removable shield that circumferentially mates with orbitals of the half-jacket frame.

In an eleventh embodiment, a removable shield for attaching to eyewear and protecting a wearer from dust blowing around the side of the eyewear is provided with a lens groove for receiving and contacting an outer edge of a lens.

In a twelfth embodiment, there is provided a method of protecting the eye of a participant in high speed sports, comprising affixing a removable shield to half-jacket eyewear.

In a thirteenth embodiment, a nosepad that is separate from an orbital is provided with a shield retainer.

In a fourteenth embodiment, a nose-contacting element having a shield retainer is provided with a cover.

In a fifteenth embodiment, rigid eyewear is provided with a pair of removable lenses that are free of any attachment structure.

In a sixteenth embodiment, eyewear comprises a half-jacket frame and has a vent hole formed in the eyewear.

In a seventeenth embodiment, eyewear frames contain titanium and have a a vent hole formed in the eyewear to reduce fogging of lenses.

In an eighteenth embodiment, a dust shield comprises detents for affixing the shield to a nose-contacting element and also has a vent formed in the shield to reduce fogging.

In a nineteenth embodiment, half-jacket eyewear has temples that carry slip resistors for contacting a wearer's skin.

In a twentieth embodiment, eyewear having temples and a removable shield is provided with slip resistors on the temples.

In a twenty-first embodiment, a temple has two holes formed therein for receiving a slip resistor.

In a twenty-second embodiment, an elastomeric slip resistor for eyewear comprises a backing having a plurality of pads formed thereon, each of the pads dimensioned to pass through a separate hole in the eyewear.

In a twenty-third embodiment, an eyewear shield comprises air vents on opposite sides of an orbital.

In a twenty-fourth embodiment, a shield for half-jacket eyewear is provided with air vents.

BRIEF DESCRIPTION OF THE DRAWINGS

FIG. 9 illustrates a partial worm's eye view of a frame front, with lenses shown in phantom.

DETAILED DESCRIPTION OF THE PREFERRED EMBODIMENT

Figure 1:
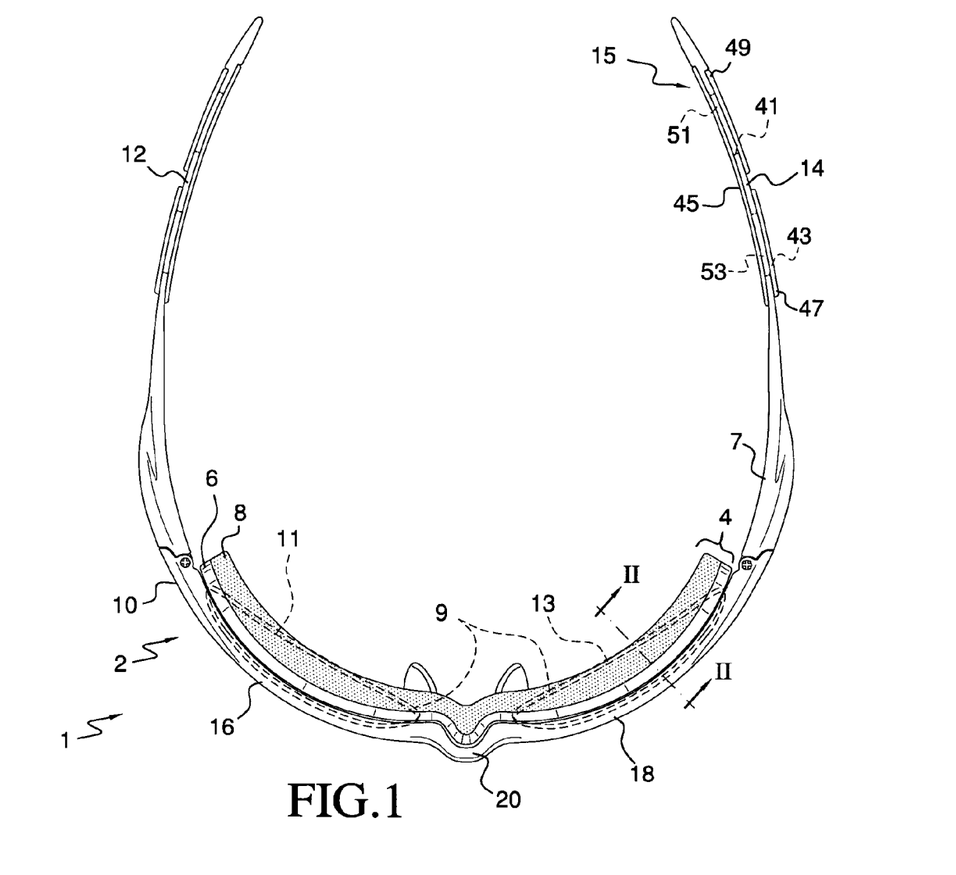
FIG. 1 shows a top view of eyewear according to an embodiment of the present invention.

FIG. 1 shows a top view of exemplary eyewear 1 of one embodiment of the present invention. Eyewear 1 consists of half-jacket goggles 2 and a rearwardly disposed shield 4. Shield 4 is advantageously removable from goggles 2.

Goggles 2 comprise frame 7 and lenses 9. Frame 7 comprises a frame front 10, a left temple 12, and a right temple 14. Frame front 10 includes a left orbital 16, a right orbital 18, and a connecting bridge 20. Lenses 9 are disposed in the orbital and include a left lens 11 and a right lens 13. Left lens 11 and right lens 13 may be clear or tinted and may each be separately removable from frame 7, for convenient replacement with a lens of choice. Right temple 14 comprises removable slip resistor 15.

Slip resistor 15 is disposed in holes 41 and 43 formed in temple 14. Slip resistor 15 comprises backing 45, pad 47, and pad 49. Backing 45 is connected to pad 47 by extension 51 disposed in hole 41. Backing 45 is also connected to pad 49, by extension 53 disposed in hole 43. Backing 45, pad 47, pad 49, extension 51, and extension 53 may be formed in one piece of elastomeric material selected to resist slipping. Slip resistor 15 is inserted into temple 14 by deforming pad 49 to fit through hole 41, and deforming pad 47 to fit through hole 43. Thus, slip resistor 15 may be press-fit into temple 14 from the side facing a wearer of eyewear. Left temple 12 has a slip resistor that is a mirror image of slip resistor 15, with a backing facing the wearer and pads facing away from the wearer. The backings are configured to contact the skin of a wearer's head, whereas the pads are configured to contact the skin of a wearer's ears, all to reduce slippage.

Shield 4 may be formed of a plastic portion 6 to which is secured a rearward foam portion 8. Plastic portion 6 may contact frame front 10. Foam portion 8 extends from plastic portion 6 and when in use serves to seal with the face of a person wearing eyewear 1, thereby sealing half-jacket frame 7 with the wearer's face and protecting the user from wind and dirt that might otherwise pass the frame 10. Shield 4 preferably has a uniform thickness less than one half inch. For example, shield 4 may have a uniform thickness of about one quarter inch.

Figure 2:
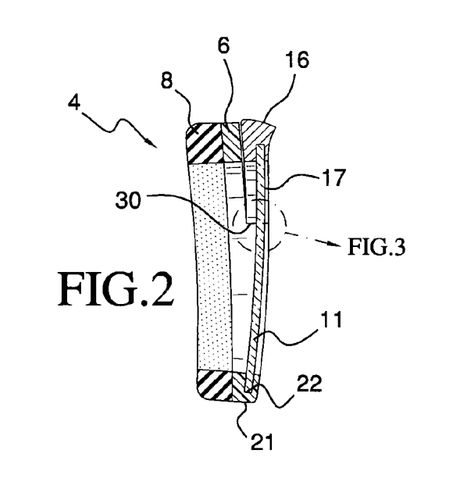
FIG. 2 is a cross section taken at lines II—II in FIG. 1 through the left orbital.
Figure 4:
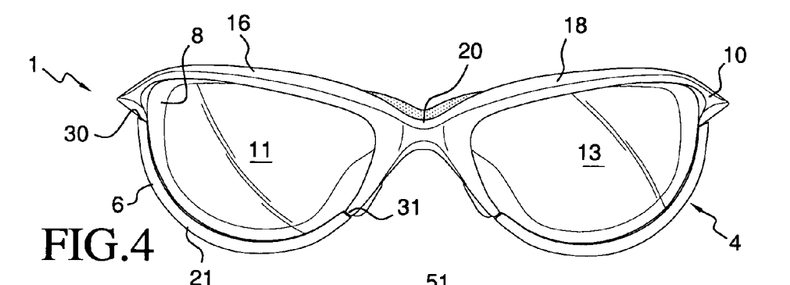
FIG. 4 is a front view of eyewear shown in FIG. 1.

FIG. 2 is a cross section taken through left orbital 16 at lines II—II in FIG. 1. Left orbital 16 contains a groove 17 therein. Groove 17 is dimensioned to receive left lens 11. Plastic portion 6 of shield 4 is shown having shield extension 21, as shown in FIG. 4. Shield extension 21 is part of shield 4 and extends in front of lens 11. Shield extension 21 may have therein a U-shaped channel 22 dimensioned to receive left lens 11. Groove 17 and U-shaped channel 22 may be of similar dimensions. The shield extension 21 and the frame front 10 are aligned such that groove 17 and U-shaped channel 22 abut each other at notch 30 and terminus 31 to form a circumferentially complete lens groove for receiving left lens 11.

Figure 3:
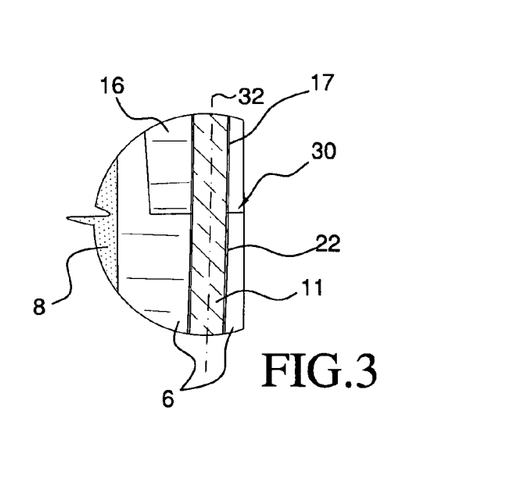
FIG. 3 is an enlarged detail drawing of the circled portion of FIG. 2.

FIG. 3 is an enlarged detail drawing of the circled portion of FIG. 2. Groove 17 is shown meeting channel 22 where plastic portion 6 abuts left orbital 16 at notch 30. Groove 17 and channel 22 may have a common center line 32 and may each have a width approximately equal to the thickness of left lens 11. For example, groove 17, channel 22, and lens 11 may each measure about 2.3 millimeters from front to back.

FIG. 4 is a front view of eyewear 1 shown in FIG. 1. Shield extension 21 is shown meeting up with left orbital 16 at both notch 30 and terminus 31. Together, shield extension 21 and left orbital 16 may completely surround left lens 11, with shield extension 21 surrounding the portion of left lens 11 that is below notch 30 and terminus 31, and left orbital 16 surrounding the remaining portion of left lens 11. Thus, shield extension 21 and its U-shaped channel 22 meet up with left orbital 16 and its groove 17 to surround continuously left lens 11. Right orbital 18 may be part of a similar arrangement for right lens 13.

Viewed from the front of eyewear 1, shield extension 21 may visually continue the outlines of frame front 10. To the casual observer, shield extension 21 visually converts eyewear 1 from a half-jacket arrangement to an apparent full-jacket arrangement. Since shield 4 may be removable from frame front 10 in eyewear 1, this arrangement provides eyewear that is convertible back and forth between a half-jacket appearance and a full-jacket appearance.

Figure 5:
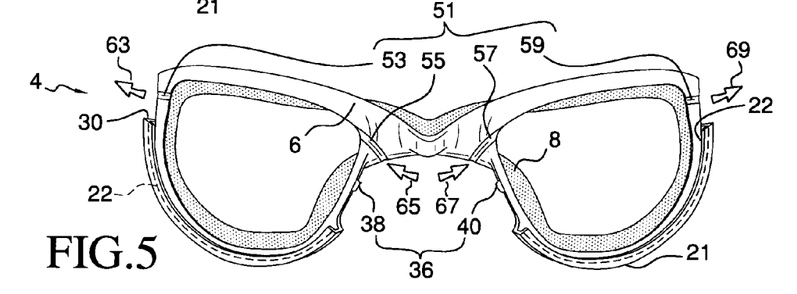
FIG. 5 is a front view of a shield.

FIG. 5 is a front view of shield 4 after removal from goggles 2. Shield 4 can be releasably secured to goggles 2 by a wide variety of means. As a first example, FIG. 5 illustrates shield detents 36 consisting of left detent 38 and right detent 40. Detents 36 may cooperate with frame front 10 to releasably secure shield 4 to goggles 2. As a second example, FIG. 2 illustrates channel 22 of shield extension 21 releasably contacting left lens 11. This contact may consist of a friction and/or press fit. Both examples may be combined to releasably secure shield 4 to goggles 2 by both detents 36 and channel 22.

As shown in FIG. 5, shield 4 comprises vents 51. Vents 51 include vent 53, vent 55, vent 57, and vent 59. Vents 51 comprise grooves formed into the front-facing surface of plastic portion 6. When eyewear 1 is worn with shield 4 in place, vents 51 operate to channel air through eyewear 1, especially when the wearer is engaging in high speed sports such as motorcycle riding. Air is channeled through eyewear 1 in a side-sweeping direction. In particular, air enters vent 55 in the direction of arrow 65, flows across the back of lens 11 in front of the wearer's eye, and exits eyewear 1 through vent 53 in the direction of arrow 63. Thus, eyewear 1 is ventilated to reduce fogging of lens 11. In like manner, fogging of lens 13 is reduced by air flowing through vents 57 and 59 in the direction of arrows 67 and 69. Vents 51 focus the fresh air on the upper portion of the lenses, where fogging tends to be worst. Preferably, intake vents 55 and 57 are curved and have a width of less than about 0.3 millimeters to help prevent ingress of particulate matter.

Figure 6:
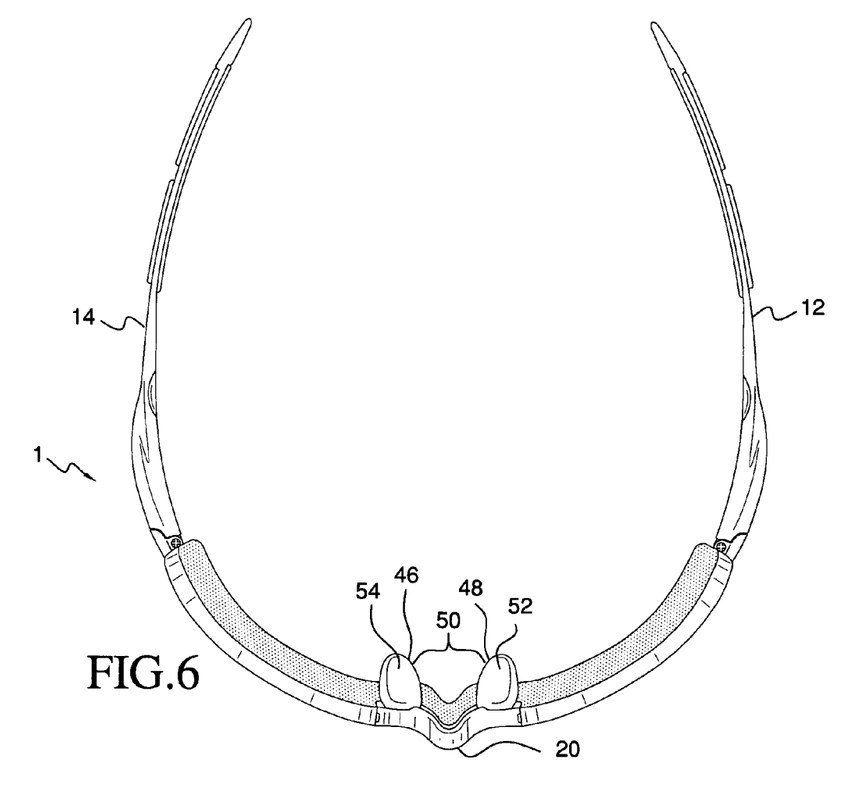
FIG. 6 is a bottom-up view of the eyewear shown in FIG. 1.

FIG. 6 is a bottom-up view of eyewear 1. As shown in FIG. 6, bridge 20 includes nosepads 50 comprising right nosepad 46 and left nosepad 48. Nosepads 50 may be molded of one piece with bridge 20, or separately supported thereby. Nosepads 50 are dimensioned and designed to contact the nose of a person wearing eyewear 1. Left nosepad 48 may be sheathed in nosepad cover 52. Right nosepad 46 may be sheathed in nosepad cover 54. Nosepad covers 52 and 54 may be formed of elastomeric material and may be removable from nosepads 50. Nosepad covers 52 and 54 may be made removable by making them of an elastic material such as elastic rubber. In that case, nosepad covers 52 and 54 can stretch over nosepads 50 and thereby be releasably secured thereto. Alternatively, nosepad covers 52 and 54 can be permanently affixed to nosepads 50, with for example a water-resistant adhesive. Preferably, nosepad covers 52 and 54 are made of anti-slip rubber.

Figure 7:
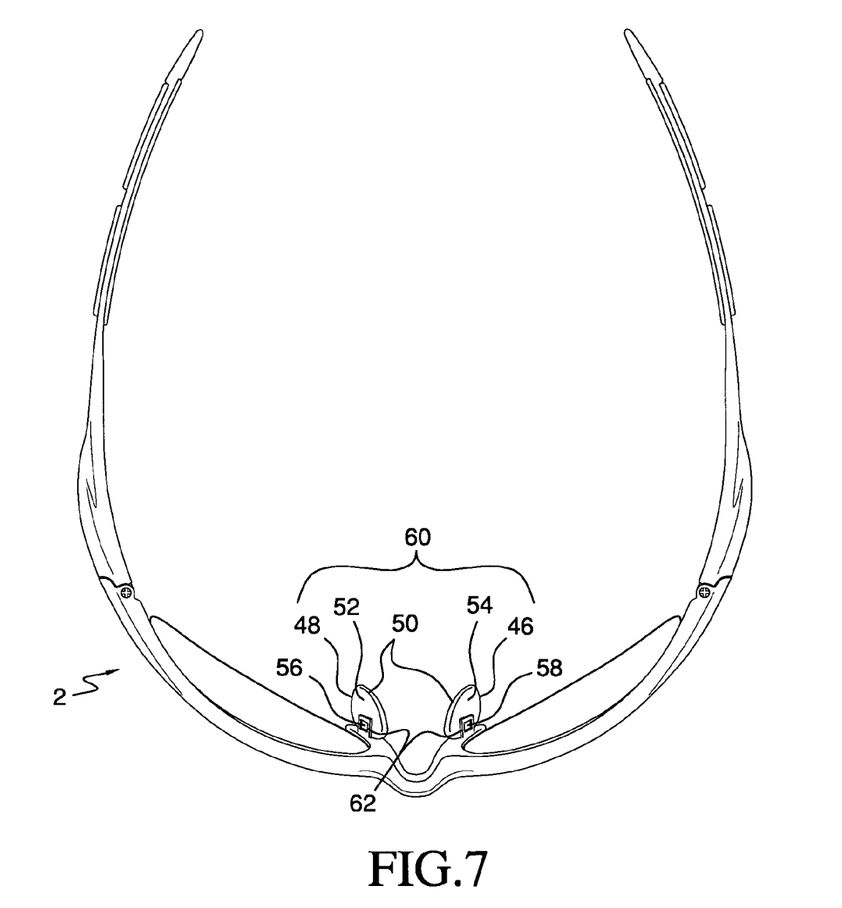
FIG. 7 is a top-down view of the goggles shown in FIG. 1, but without the shield.

FIG. 7 is a top-down view of the goggles shown in FIG. 1, but without the shield 4. As seen in FIG. 7, left nosepad 48 may comprise indent 56. In like fashion, right nosepad 46 may comprise indent 58. Indents 56 and 58 may each comprise a rectangular recess molded into or cut out of nosepads 50. Indents 56 and 58 may be dimensioned to mate with shield detents 36 shown in FIG. 5. Preferably, the dimensions of indents 56 and 58 are tightly controlled to form a snap fit with shield detents 38 and 40, respectively.

As seen in FIG. 7, nosepad cover 52 does not cover indent 56 and nosepad cover 54 does not cover indent 58. Preferably, nosepad cover 52 has a cut-out for indent 56, and nosepad cover 54 has a cut-out for indent 58, as illustrated in FIG. 7. Alternatively, nosepad covers 52 and 54 may cover the entirety of nosepads 48 and 46, respectively. In that case, indents 56 and 58 may be formed directly in nosepad covers 52 and 54, respectively.

Figure 15:
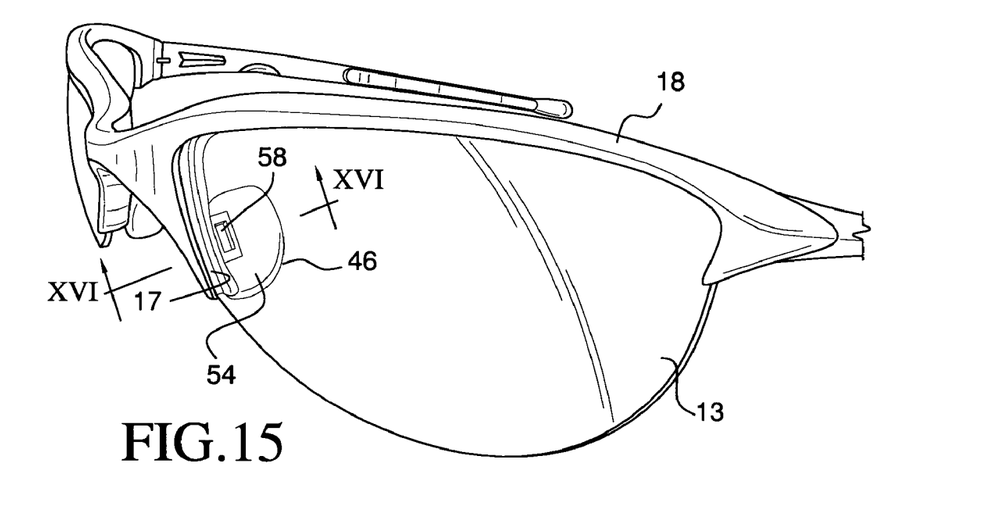
FIG. 15 is a view of a right orbital as seen from the right side of the goggles illustrated in FIG. 7.

FIG. 15 is a view of right orbital 18 as seen from the right side of goggles 2 illustrated in FIG. 7. Through lens 13 can be seen nosepad 46 partially covered by nosepad cover 54 and having indent 58 for mating with detent 38 shown in FIG. 5.

The inventors have determined that consumer acceptance of convertible goggles may be limited if the goggles were to contain shield retainer means that are obviously visible when the shield is not attached. Convertible goggles may be more aesthetically pleasing and commercially acceptable if the goggles' shield retainer means are substantially hidden when the goggles are used without a shield. This is particularly hard to achieve in a half-jacket design because there is no lower frame piece to help carry and/or shield from view a shield retainer.

While indent 58 is shown through lens 13 in FIG. 15, in practice the reflectivity and tint of lens 13 make indent 58 substantially invisible through lens 13. An observer must look through lens 13 at a steep angle, peering through substantially more lens thickness than the front-to-back thickness of lens 13. This substantially reduces the visibility of indent 58. Thus, shield retainers 62 are substantially hidden even when shield 4 is removed from goggles 2 and goggles 2 are not being worn. When goggles 2 are worn on a person's head, the head will block most light from striking the back of the lens, thereby enhancing the apparent reflectivity of lens 13 and rendering indent 58 substantially invisible. When shield 4 is in place it covers indent 58, making indent 58 invisible as in FIG. 1.

Regardless of whether goggles 2 are being worn, indents 56 and 58 are substantially hidden from view when shield 4 is removed from goggles 2. Indents 56 and 58 are invisible from the front of goggles 2, as in FIG. 8. Indents 56 and 58 are invisible from the bottom of goggles 2, as shown in FIG. 6. Indents 56 and 58 are invisible from the back of goggles 2 because the indents are in the front-facing surfaces of nosepads 50. Thus, eyewear 1 can provide goggles 2 that can be used without shield 4 and yet contain shield retainers 62 substantially hidden from view. This is desirable to enhance consumer acceptance of half-jacket goggles 2 for use without shield 4, while still providing the option of using shield 4.

When goggles 2 are worn with or without shield 4, indents 56 and 58 are substantially invisible. In general, this embodiment provides goggles 2 with shield retainers 62 that are substantially hidden when goggles 2 are not worn and shield 4 is removed, substantially invisible when goggles 2 are worn without shield 4, and invisible when goggles 2 have shield 4 attached thereto.

Also seen in FIG. 15 is the seating of lens 13 in groove 17.

Figure 16:
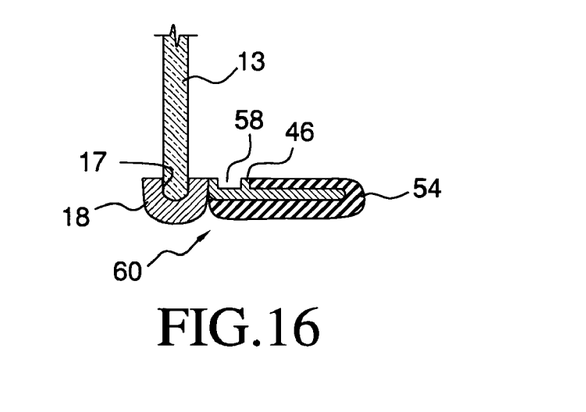
FIG. 16 is a cross section taken through lines XVI—XVI in FIG. 15.

FIG. 16 is a cross section taken through lines XVI—XVI in FIG. 15. This cross section shows indent 58 formed in the small portion of nosepad 46 that is not covered by nosepad cover 54. Nosepad 46 and orbital 18 may be molded together in one piece. Alternatively, nosepad 46 may be attached to orbital 18, by welding for example.

In general, nose contacting element 60 (see FIG. 7) may have formed therein a shield retainer 62. Preferably, shield retainer 62 is formed on a surface of nose contacting element 60 that does not contact a wearer's nose. For example, shield retainer 62 is illustrated in FIG. 7 as being formed in a surface of nose contacting element 60 opposite the surface that contacts a wearer's nose. In the illustrated embodiment, nose contacting element 60 comprises nosepads 50 having nosepad covers 52 and 54, and shield retainer 62 comprises indents 56 and 58. Indents 56 and 58 may be formed on a surface of nosepads 50 that does not contact a wearer's nose. For example, indents 56 and 58 may be formed on the surface of nosepads 50 that is opposite the one for contacting a wearer's nose.

Figure 8:
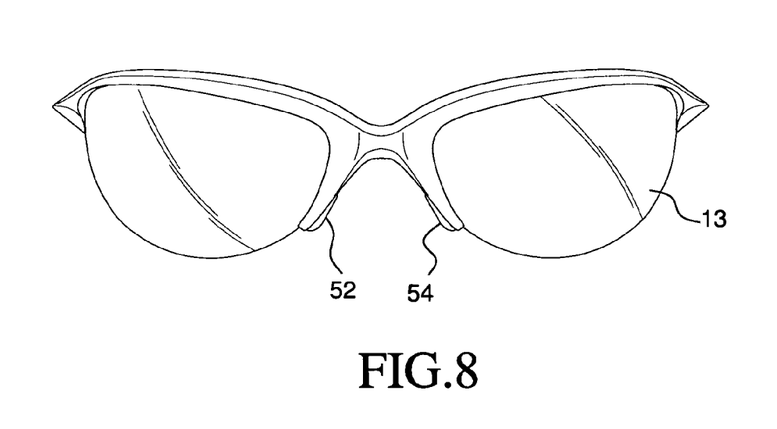
FIG. 8 is a front view of the goggles shown in FIG. 7.

FIG. 8 is a front view of the goggles shown in FIG. 7. As seen in FIG. 8, nosepad covers 52 and 54 extend slightly closer to a user's nose (not shown) than the surfaces from which they depend. In this embodiment, nosepad covers 52 and 54 are the only portion of goggles 2 that contact a user's nose. As illustrated, the nosepad covers may cover more than fifty percent of the nose pads. In a preferred embodiment, the nosepads cover more than eighty percent of the nosepads but do not cover the shield retainer 62.

In one alternative embodiment (not shown), indent 56 may be formed in a separate element extending rearwardly from left orbital 16 underneath bridge 20 and terminating just beyond indent 56. For example, this element may consist of the small portion of nosepad 48 that is shown not covered by nosepad cover 52. In a second alternative embodiment (not shown), indent 52 may be formed in the portion of left orbital 16 that is underneath bridge 20, behind left lens 11 and facing in the direction of left temple 12.

FIG. 9 illustrates a partial worn's eye view of frame front 10, with lenses 11 and 13 shown in phantom. Groove 17 may be formed on the lens-facing surface of orbital 16 and may comprise a trench defined by front edge 70 and rear edge 74. The material of orbital 16 that lies forward of groove 17 defines front ridge 78. The material of orbital 16 that lies rearward of groove 17 defines rear ridge 80. The front edge 70 of groove 17 defines the rear edge of front ridge 78. The rear edge 74 of groove 17 defines the front edge of rear ridge 80.

The distance from front edge 70 of groove 17 to front surface 72 of orbital 16 may vary in a tapered fashion. In other words, front ridge 78 may vary in thickness from front to back along its run from left to right in orbital 16.

At the same time, rear edge 74 of groove 17 may maintain a constant distance from the rear surface 76 of orbital 16. In other words, rear ridge 80 may be uniform in thickness from front to back along its run from left to right in orbital 16.

Groove 17 is dimensioned and shaped to receive tightly lens 11. Groove 17 may be of constant width measured from front edge 70 to rear edge 74. For example, the width of groove 17 may be about 2.3 millimeters. For a lens 11 that is also about 2.3 millimeters in thickness, such a groove would hold lens 11 tightly between front ridge 78 and rear ridge 80. This may be a press-fit with no adhesion, which would permit lens 11 to be repeatedly removed and re-inserted in goggles 2 by a user. Alternatively, lens 11 may be adhered in groove 17 or permanently affixed to frame front 10 to provide goggles having permanently attached lenses.

Left orbital 16 (and right orbital 18) may be made of a strong cast metal such as for example titanium or titanium alloy. Preferably, the strength of the cast metal is at least about that of titanium. The strength of the material will dictate a minimum average width of front ridge 78 and rear ridge 80 to achieve dimensional stability in the absence of lens 11. For example, this minimum average width for titanium may be about 1 millimeter over a run of at least one half inch. However, with lens 11 tightly in place between front ridge 78 and rear ridge 80 in the present embodiment, the dimensional stability of front ridge 78 may be supplemented by the dimensional stability of lens 11 and rear ridge 80, especially where rear ridge 80 has an average depth substantially in excess of the minimum average width.

In a preferred embodiment, the sum of the average widths of the front ridge 78 and the rear ridge 80 along a given run of at least one-half inch totals at least about twice the minimum average width. At the same time, the average width of one of those two ridges along that run may be substantially less than the minimum average width, with the deficiency in dimensional stability made up by the thickness of the other one of the two ridges exceeding the minimum average width.

If frame front 10 is made of a material having a certain minimum average width of a lone ridge to achieve dimensional stability of goggles 2 without lenses 11 and 13, and rear ridge 80 has an average width greater than that minimum average width, front ridge 78 can be made narrower than the minimum average width. For example, if left orbital 16 is made of a material having a minimum average width of one millimeter over a run of one-half inch, and rear ridge 80 has an average width of two millimeters, the front ridge 78 can have an average width much smaller than one millimeter, such as about 0.3 millimeters over a run of at least one-half inch.

In a preferred embodiment constructed of titanium or titanium alloy, the thickness of rear ridge 80 is maintained at or above two millimeters whereas the thickness of front ridge 78 tapers gradually from about 2.0 millimeters at the left end of left orbital 16, down to about 0.3 millimeters or less in an intermediate portion of left orbital 16, and back up to about 2.0 millimeters at the right end of left orbital 16. The intermediate portion is between the left end and the right end and averages about 0.3 millimeters over a run of about one-half inch. Most preferably, the intermediate portion averages less than about 0.6 millimeters over a run of about one inch.

Frame front 10 may be cast in one piece as a rigid member, preferably containing titanium. In a preferred embodiment, nosepads 50 are cast in one piece with frame front 10.

Figure 10:
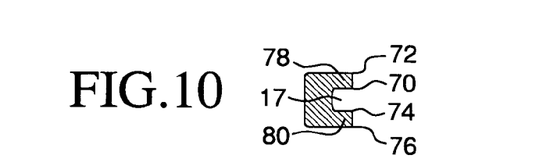
FIG. 10 shows a cross-section taken along lines X—X of FIG. 9, at the left end of the left orbital.

FIG. 10 shows a cross-section of orbital 16 taken along lines X—X of FIG. 9, at the left end of orbital 16. As shown therein, front ridge 78 has a width of about 2.0 millimeters at the left end of orbital 16.

Figure 11:
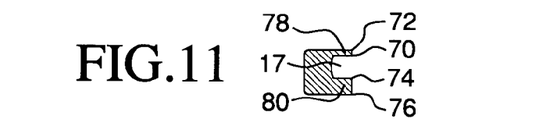
FIG. 11 shows a cross-section taken along lines XI—XI of FIG. 9, in an intermediate section of the left orbital.

FIG. 11 shows a cross-section taken along lines XI—XI of FIG. 9, in an intermediate section of left orbital 16. As shown therein, front ridge 78 has a width of about 0.3 millimeters at this intermediate point of orbital 16.

Figure 12:
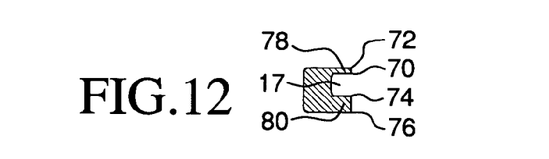
FIG. 12 shows a cross-section taken along lines XII—XII of FIG. 9, in an intermediate section of the left orbital.

FIG. 12 shows a cross-section taken along lines XII—XII of FIG. 9, in an intermediate section of left orbital 16. As shown therein, front ridge 78 has a width of about 0.6 millimeters at this intermediate point of orbital 16. The run between the intermediate point in FIG. 11 and the intermediate point in FIG. 12 is at least about one inch. In that run, the average width of front ridge 78 is less than about 0.6 millimeters. For at least one-half inch of that run, the width of front ridge 78 is never greater than about 0.3 millimeters.

Figure 13:
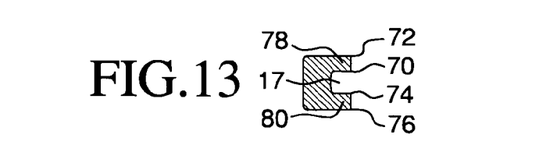
FIG. 13 shows a cross-section taken along lines XIII—XIII of FIG. 9, at the right end of the left orbital.

FIG. 13 shows a cross-section of orbital 16 taken along lines XIII—XIII of FIG. 9, at the right end of orbital 16. As shown therein, front ridge 78 has a width of about 2.0 millimeters at the right end of orbital 16.

In each of FIGS. 10–13, the width of groove 17 is constant. As illustrated, a preferred width is about 2.3 millimeters. Further as illustrated, the curvature of lenses 11 and 13 is too high, about eight, to take a prescription. Lenses of such high curvature are referred to as "wrap-around" because they may wrap partially around the side of a user's face. Lenses 11 and 13 preferably are non-prescription wrap-around lenses of constant thickness and are removeably held in a groove of constant width.

The width of rear ridge 80 is also shown constant in FIGS. 10–13, at about 2.0 millimeters. However, this width need not be constant along its run from left to right in orbital 16.

Figure 14:
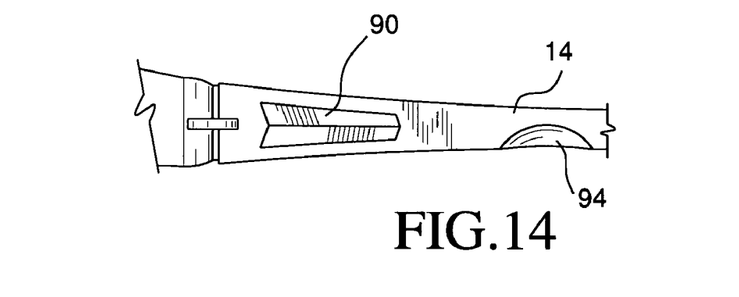
FIG. 14 illustrates part of a right temple as seen from the left side.

FIG. 14 illustrates part of right temple 14 as seen from the left side. This is the part of right temple 14 that is near frame front 10 and that faces the head of a wearer wearing goggles 2. A groove 90 and a thumb depression 94 are formed in that part.

Groove 90 can be formed during initial casting of temple 14. Alternately, it can be formed by removing material from a pre-formed temple. Groove 90 may be in the shape of a "V" as illustrated. Alternatively, groove 90 could be in the shape of a "U" or other suitable shape.

Thumb depression 94 is preferably an arcuate "scoop" shape taken out of the inside lower corner of right temple 14. It is shaped and dimensioned to provide a firm gripping place for a person's thumb. The gripping action may be enhanced by providing a substantially parallel angled surface on the opposite side of right temple 14. For example, when thumb depression 94 is formed on the inside lower corner of right temple 14 as shown, the substantially parallel angled surface may be formed on the outside upper corner of right temple 14. A person can hold goggles 2 with opposing force between a thumb placed in thumb depression 94 and a forefinger of the same hand placed on the substantially parallel angled surface. This type of grip is much less likely to damage goggles 2 than a grip that involves a user touching lens 11 below frame front 10. It is especially beneficial where lens 11 is held in frame front 10 removably and/or by a narrow front ridge 78. Thus, the easy grip provided for the temples helps permit the front ridge 78 to have an average width less than the average minimum width discussed above while still achieving dimensional stability and durability of the goggles.

Groove 90 and thumb depression 94 both enhance the ability of a user to grip goggles 2. This is especially important because goggles 2 comprise a half-jacket frame front 10, which cannot be grabbed by a user as easily as a full-jacket front frame. Groove 90 and thumb depression 94 help protect the dimensional stability of frame front 10 by encouraging people to grip the temples and not the frame front while putting on, removing, handling, or adjusting goggles 2. Gripping the frame front of half-jacket goggles can lead to damage of the goggles because the user may apply force directly to a lens or to a thin ridge. Such force may accidentally remove the lens from the frame front.

Groove 90 and thumb depression 94 both reduce the weight of right temple 14 while still maintaining strength and stability of right temple 14. Groove 90 and thumb depression 94 are invisible when a wearer is wearing goggles 2 and therefore do not affect the overall appearance of the goggles when worn.

Groove 90 and thumb depression 94 act together on goggles 2, to reduce weight while maintaining sufficient strength and stability, and to prevent damage by providing a safe place to grip goggles 2.

Left temple 12 may be outfitted with a groove and depression similar to groove 90 and thumb depression 94.

As shown in FIGS. 6 and 7, each of nosepads 46 and 48 may extend a distance rearwardly away from its respective orbital. This rearward direction appears in FIGS. 6 and 7 as the upward direction (extending from the orbital toward the top of the page). The rearward direction is also shown in FIG. 16 as extending from left to right on the page. At the same time, each nosepad also extends a distance along its orbital, generally parallel to the orbital at the point of attachment. This orbital distance appears in FIG. 15 as a diagonally upward and leftward direction (extending from the bottom of nosepad 46 diagonally upward and leftward on the page). As illustrated in FIGS. 6, 7, and 15, each nosepad extends in the rearward direction nearly as far as in the orbital direction. Thus, the nosepad may extend in the rearward direction a distance at least as great as approximately the distance the nosepad extends in the orbital direction.

Figure 17:
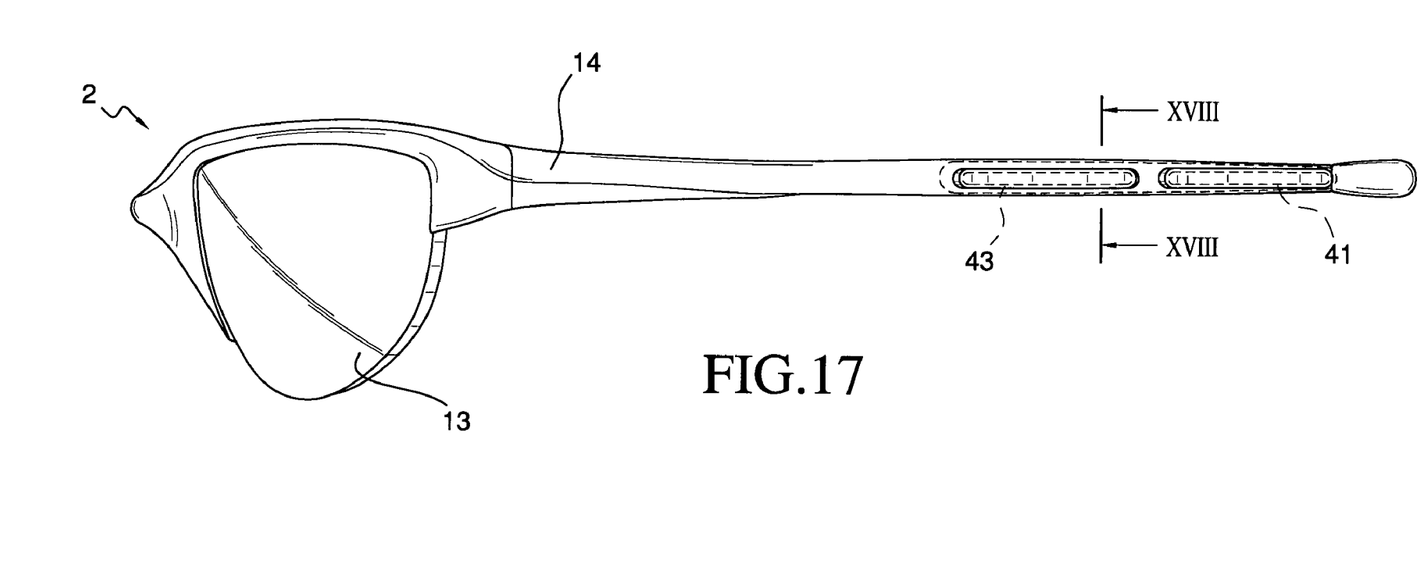
FIG. 17 is a right-side view of the goggles depicted in FIG. 7.

FIG. 17 shows goggles 2 from the right side. Due to the reflectivity of lens 13, shield retainer 62 is invisible in this side view.

Figure 18:
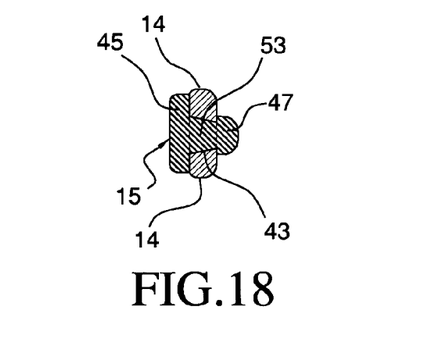
FIG. 18 is a cross-section taken along lines XVIII—XVIII of FIG. 17.

FIG. 18 is a cross-section taken at lines XVIII—XVIII of FIG. 17. Slip resistor 15 is shown inserted into temple 14. Pad 47 of slip resistor 15 is connected to backing 45 by extension 53. Pad 47 has rounded surfaces facing away from temple 14. Temple 14 has formed therein hole 43, which is taped from a larger radius to a smaller radius from right to left. The rounded surfaces and tapered hole facilitates a force-fit through hole 43 in temple 14.

Slip resistor 15 is installed in temple 14 by pressing the rounded edges into tapered hole 43 from the right side of temple 14. This is the side that would face a wearer of the eyewear. Pad 47 is deformed when it meets the tapered edges of hole 43. Upon further pushing, pad 47 is deformed sufficiently that its outer diameter is equal to the smallest radius of tapered hole 43. At this point, pad 47 passes through hole 43 from right to left, and tapered extension 53 mates with tapered hole 43. Backing 45 rests snugly against the right side of temple 14.

Slip resistor 15 is removable by reversing those installation steps. The removability of slip resistor 15 permits replacement of a damaged slip resistor. It also permits eyewear 1 to be worn without slip resistors.

When slip resistor 15 is installed and goggles 2 are worn, backing 45 bears against skin of a wearer's head, and pad 47 bears against the wearer's ear or helmet, for example.

In a preferred embodiment there is provided durable and dimensionally stable convertible eyewear 1 that includes half-jacket goggles 2 having shield retainer 62 substantially hidden from view when goggles 2 are not worn and substantially invisible when goggles 2 are worn. Freedom of stylistic design is enhanced with a front ridge 78 that has an average width less than the minimum average width for a lone ridge, while durability and weight reduction are enhanced by the provision of thumb depression 94 for gripping goggles 2 without touching half-jacket frame front 10. Aesthetic appeal and commercial acceptance are enhanced by providing half-jacket goggles whose shield retainer 62 and eyewear gripping means 94 are substantially invisible when the goggles are worn.

Preferably, lenses 11 and 13 are removable from goggles 2. The removability of lenses 11 and 13 permits them to be replaced with different types of lenses for different conditions. For example, when a wearer desires to drive a motorcycle at night and receive the protection of shield 4 without the tint of lenses 11 and 13, the wearer can pop out lenses 11 and 13 and pop in replacement lenses that do not have a tint. Eyewear 1 can be sold with or accommodate use of an array of different colored lenses for fashion or function.

The removability of lenses 11 and 13 also permits replacement of damaged lenses. Half-jacket goggles may be more prone to lens damage than full-jacket goggles because the bottom edges of the lenses are exposed. Thus, the half-jacket goggles are preferably provided with removable and replaceable lenses. In addition, lenses in eyewear worn by a participant in high speed sports may be more prone to damage. For example, if goggles fell off the face of a motorcycle rider traveling at high speed, lenses in the goggles may be subject to damage when the goggles hit the ground. Providing replaceable lenses may reduce the cost and effort required to repair damaged goggles worn by a participant in high speed sports.

Although eyewear 1 is shown with an upper half-jacket frame (having no orbital underneath of the lenses), other embodiments are contemplated. For example, the removable shield or the nosepad/retainer arrangement can be employed in a lower halfjacket or a full jacket frame.

The embodiment of FIG. 1 is illustrated as including unfiltered vents in shield 4. In an alternative embodiment, air vents may be formed in frame front 10. Vents may be covered with an air permeable filter to screen out particulate matter. Instead of or in addition to the air vents, shield 4 may be made of air permeable material to reduce fogging of lenses 11 and 13.

In a preferred apparatus, eyewear for protecting the eyes of a motorcycle rider from blowing dust may comprise:

two lenses comprising a transparent tinted material free of all holes, notches, and tabs, the two lenses comprising first and second lenses each having a perimeter with a circumferential transverse edge and each being non-prescriptioned;

a frame with a half-jacket frame front adapted to receive removable lenses in two upper lens grooves in the half-jacket frame, the half-jacket frame front being inflexible;

a removable shield for eliminating direct impingement of moving unfiltered air and dust on a wearer's eye, the removable shield configured to extend from the half-jacket frame front to the wearer's face and to form a first sealed tunnel between the first lens and the wearer's first eye and a second sealed tunnel between the second lens and the wearer's second eye, the removable shield having formed therein a vent for reducing fogging of the lenses, the removable shield being of a uniform thickness less than one half inch, the removable shield comprising:

a plastic portion for contacting the frame and the lenses, the plastic portion having two lens openings and two lower lens grooves, the two lower lens grooves mating coterminously with the two upper lens grooves to form two complete lens grooves circumferentially surrounding the two lenses, the two lower lens grooves directly contacting the circumferential transverse edge of the lenses; and a foam portion comprising air permeable material, the foam portion having two lens openings substantially aligned with the two lens openings in the plastic portion;

a nosepad attached to the half-jacket frame front, the nosepad and the halfjacket frame front being cast together in one piece out of metal comprising titanium;

a shield retainer formed in the nosepad and configured to releasably retain the removable shield, the shield retainer comprising an indent, and the shield retainer being:

substantially hidden when the removable shield is removed from the half-jacket frame front and the eyewear is not worn; and substantially invisible when the removable shield is removed from the half-jacket frame front and the eyewear is worn with the lenses in the half-jacket frame front;

a nosepad cover covering more than half of the nosepad but not covering the shield retainer, the nosepad cover comprising anti-slip rubber; and two substantially rigid temples, each one of the temples having formed therein an arcuate thumb-shaped indentation for gripping the eyewear, each one of the temples also carrying a slip resistor configured to contact the wearer's skin, the slip resistors each comprising a backing and a plurality of plugs removably fitted into a plurality of holes in each temple.

As indicated in the Summary of the Invention, there are many embodiments of the present invention that do not contain all of the elements of that preferred apparatus. Many of those embodiments are intended to be much broader in scope than the preferred apparatus.

In a preferred method of protecting the eyes of a motorcycle rider from blowing dust, the aforementioned preferred apparatus is provided to the rider.

Other methods within the present invention, including use of each embodiment described in the Summary of the Invention, are much broader and do not require use of the preferred apparatus to protect a wearer.

Figure 19:
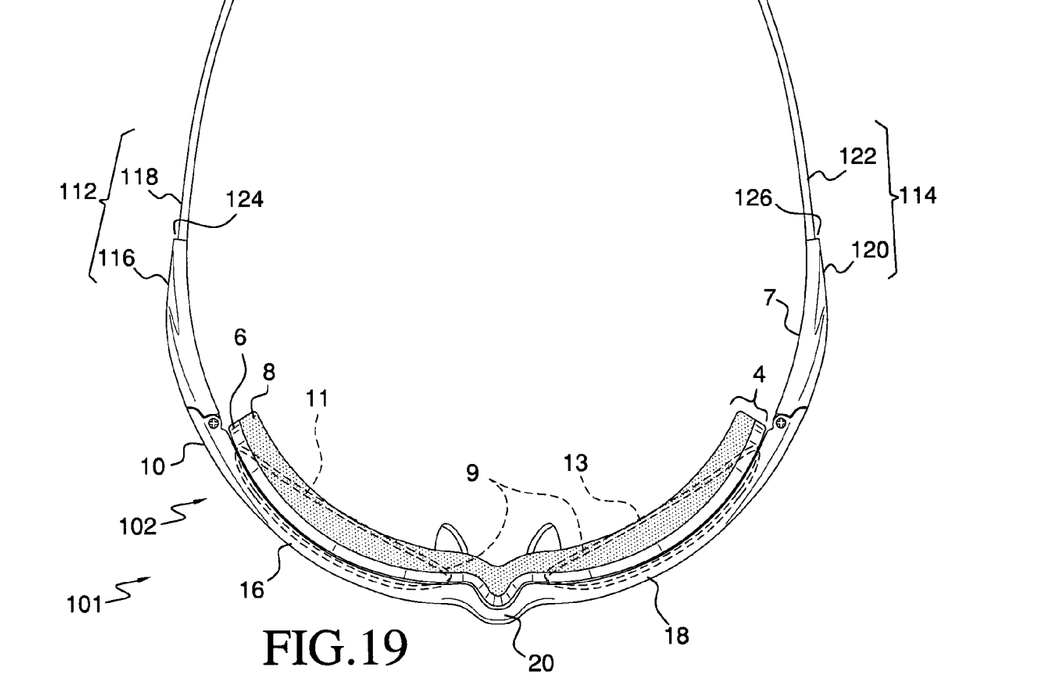
FIG. 19 shows a top view of eyewear according to an alternate embodiment of the present invention.

FIG. 19 shows an alternate embodiment, in which eyewear 101 comprises goggles 102 and shield 4. Goggles 102 comprises left temple 112 and right temple 114. Left temple 112 has a full portion 116 and a narrow portion 118. Right temple 114 has a full portion 120 and a narrow portion 122. The narrow portions transition to the full portions in step-downs 124 and 126.

Figure 20:
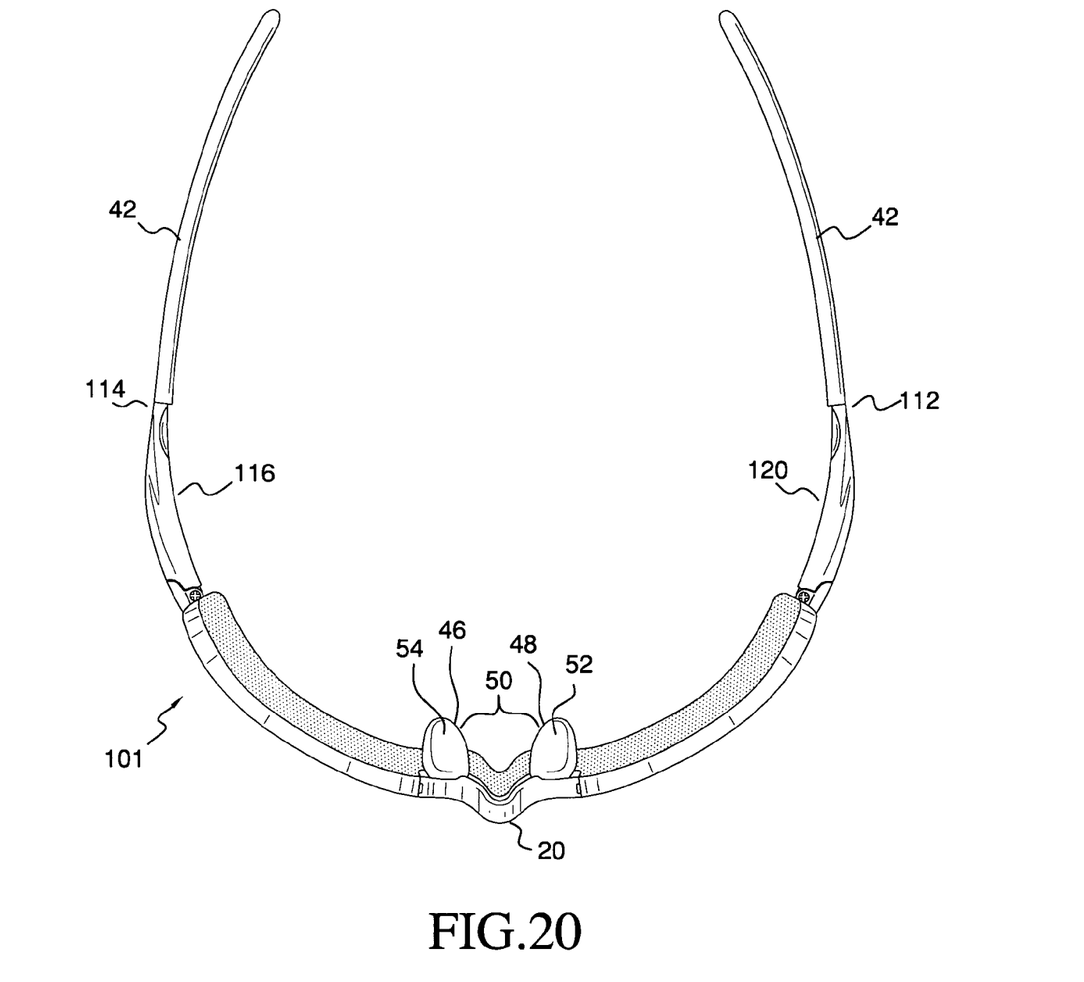
FIG. 20 is a bottom-up view of the eyewear shown in FIG. 19.

FIG. 20 illustrates a bottom-up view of the eyewear shown in FIG. 19, with the addition of a pair of identical elastomeric slip resistors 42. Slip resistors 42 are sleeves that surround narrow portions 118 and 122. The front ends of slip resistors 42 abut step-downs 124 and 126. The radial thickness of slip resistors 42 may be approximately equal to step downs 124 and 126 such that a smooth transition is effected between slip resistors 42 and full portions 116 and 120.

Figure 21:
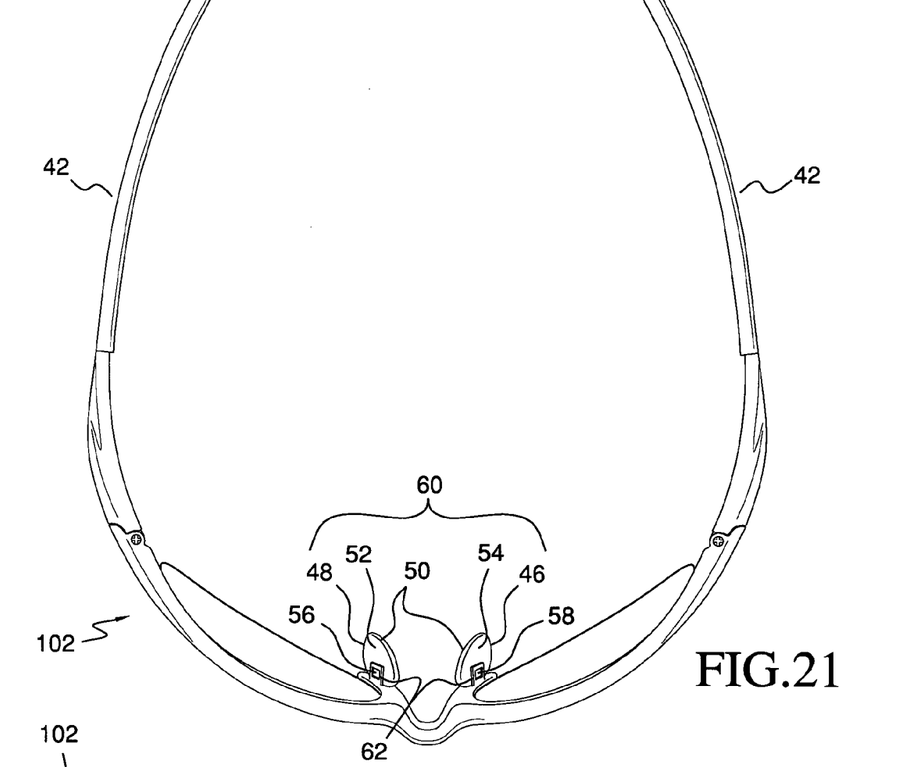
FIG. 21 is a top-down view of the goggles shown in FIG. 19, but without the shield.

FIG. 21 shows a top-down view of goggles 102 with slip resistors 42.

Figure 22:
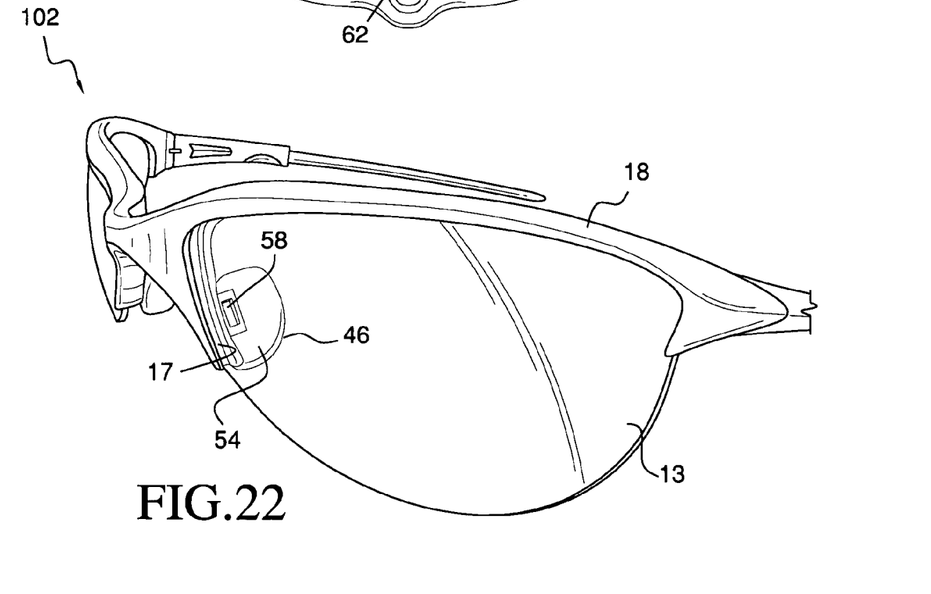
FIG. 22 is a partial side view of the goggles shown in FIG. 19.

FIG. 22 is a partial side view of goggles 102 after removal of slip resistors 42.

Slip resistors 42 may be affixed to the temples with a suitable adhesive, or may simply be positioned over the temples and removably retained thereon by friction. Temples 112 and 114 may be notched or knurled to increase friction. When adhesive is used, the adhesive is preferably water-resistant. Slip resistors 42 may be closed over the back ends of temples 112 and 114 in a cupping arrangement.

We claim:

1. Eyewear comprising:
   a first lens and a second lens;
   a frame with a half-jacket frame front adapted to receive the first lens and the second lens; and
   a removable shield for reducing direct impingement of moving unfiltered air and dust on a wearer's eye, the removable shield configured to extend from the half-jacket frame front to the wearer's face and having two lens openings,
   wherein the removable shield forms a first tunnel between the first lens and the wearer's first eye and a second tunnel between the second lens and the wearer's second eye.

2. The eyewear of claim 1, wherein the removable shield has a uniform thickness.

3. The eyewear of claim 2, wherein the uniform thickness is about one quarter inch.

4. The eyewear of claim 1 wherein the half-jacket frame front is rigid and cast in one piece from a metal comprising titanium.

5. The eyewear of claim 1 wherein the shield further comprises a rigid plastic portion and a foam portion attached thereto, the foam portion comprising air-permeable foam, the rigid portion adapted to be seated against a rearward face of the half jacket frame and the foam portion adapted to contact the wearer's face when the eyewear is in use.

6. The eyewear of claim 1, further comprising a vent configured to reduce fogging of the lens.

7. The eyewear of claim 6, wherein the vent is formed in the half-jacket frame front.

8. The eyewear of claim 6, wherein the vent is formed in the removable shield.

9. The eyewear of claim 1, wherein the eyewear is vent-free.

10. The eyewear of claim 1, further comprising substantially rigid temples.

11. The eyewear of claim 10, further comprising slip resistors carried by the temples.

12. The eyewear of claim 11, wherein the slip resistors are permanently affixed to the temples with an adhesive.

13. Eyewear comprising:
   a first orbital and a second orbital;
   a first lens and a second lens disposed respectively in the first and the second orbital, a connecting bridge between said orbital;
   said first and second orbital extending respectively over upper portions of said first and said second lens so as to form a half jack from a said half-jacket frame front adapted to receive the first lens and the second lens;
   a removable shield for reducing direct impingement of moving unfiltered air and dust on a wearer's eye, the removable shield configured to extend from the half-jacket frame front to the wearer's face and configured to seal the frame front to a wearer's face when in use to prevent direct impingement of air and dust from outside the eyewear on the wearer's eyes, said shield having two lens openings,
   the removable shield forming a first tunnel between the first lens and the wearer's first eye and a second tunnel between the second lens and the wearer's second eye, and
   shield retainer means, said shield retainer means being substantially hidden when the shield is removed.

14. The eyewear of claim 13 further including a shield retainer carried by the nose contacting element, the nose contacting element having:
   a nosepad extending rearwardly from the half jacket frame; and
   a nosepad cover at least partially covering the nosepad.

15. The eyewear of claim 14 wherein the shield retainer carried by the nose-contacting element is the sole means of attachment provided for a shield.

16. The eyewear of claim 13, further comprising:
a substantially rigid temple comprising temple gripping means for a person to grip the temple, the temple gripping means being substantially hidden when the goggles are worn, the temple gripping means comprising an arcuate thumb-shaped indentation formed in the temple.

17. The eyewear of claim 13 wherein each orbital of the half-jacket frame has formed therein a lens-retaining groove defined by at least one lens-retaining ridge running from left to right along the half-jacket frame, the lens-retaining ridge having at least one long run measuring about one inch from left to right along the half-jacket frame front, the long run of the lens-retaining ridge having a cross-sectional dimension averaging less than about 0.6 millimeters.

18. The eyewear of claim 17 wherein the lens-retaining ridge has at least one short run measuring one-half inch from left to right along the half-jacket frame, the short run of the lens-retaining ridge having a cross-sectional dimension averaging no more than about 0.3 millimeters.

19. The eyewear of claim 17 wherein the lens-retaining ridge comprises titanium.

* * * * *

UNITED STATES PATENT AND TRADEMARK OFFICE
CERTIFICATE OF CORRECTION

| | | |
|---|---|---|
| PATENT NO. | : 7,091,634 B2 | Page 1 of 1 |
| APPLICATION NO. | : 10/608123 | |
| DATED | : August 15, 2006 | |
| INVENTOR(S) | : KENNON YI and KYUNG H.MIN | |

It is certified that error appears in the above-identified patent and that said Letters Patent is hereby corrected as shown below:

On the cover page, Item (75), the Inventor's first name is "Kennon" instead of "Kenyon".

Signed and Sealed this

Twenty-first Day of November, 2006

JON W. DUDAS
*Director of the United States Patent and Trademark Office*